United States Patent Office 3,296,259
Patented Jan. 3, 1967

---

3,296,259
3,4 - DIHYDRO-4-HYDROXY-2H-1,3-BENZOXAZIN-2-ONES AND A PROCESS FOR THEIR PREPARATION
Richard E. Strube, Kalamazoo, Mich., assignor to The Upjohn Company, Kalamazoo, Mich., a corporation of Delaware
No Drawing. Filed Mar. 27, 1964, Ser. No. 355,466
17 Claims. (Cl. 260—244)

This invention pertains to novel organic chemical compounds and a process for preparing the same. The invention is more particularly directed to novel 3,4-dihydro-4 - hydroxy - 3 - loweralkyl - 2H-1,3-benzoxazin-2-ones and 3,4 - dihydro - 4 - hydroxy-3-phenyl-2H-1,3-benzoxazin-2-ones, a novel process for preparing the same by reacting a 2-hydroxybenzaldehyde with a loweralkyl isocyanate or phenyl isocyanate, and a novel process for preparing 2-hydroxybenzylamines.

The novel 3,4-dihydro-4-hydroxy-2H-1,3-benzoxazin-2-ones of this invention can be represented by the following structural formula:

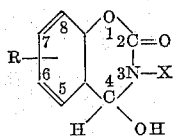

I wherein R is selected from the group consisting of benzo and from zero to not more than 4 members selected from the group consisting of alkyl of not more than 3 carbon atoms, alkoxy of not more than 3 carbon atoms, loweralkylcarbamyloxy, phenylcarbamyloxy, halogen, and nitro; and X is selected from the group consisting of loweralkyl and phenyl. Examples of loweralkyl include methyl, ethyl, propyl, butyl, pentyl, hexyl, heptyl, and octyl and the isomeric forms thereof; examples of halogen include fluorine, chlorine, bromine, and iodine; examples of alkyl of not more than 3 carbon atoms are methyl, ethyl, propyl, and isopropyl; and examples of alkoxy of not more than 3 carbon atoms are methoxy, ethoxy, propoxy, and isopropoxy. The benzo group can be in the 5,6-, 6,7-, or 7,8-positions.

The novel 3,4-dihydro-4-hydroxy-2H-1,3-benzoxazin-2-ones of Formula I are provided according to the novel process of the invention by reaction of a 2-hydroxybenzaldehyde with a loweralkyl isocyanate or phenyl isocyanate in the presence of a basic catalyst and an inert reaction medium. The reaction proceeds readily with 2-hydroxybenzaldehydes of the formula:

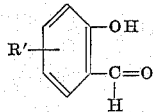

II wherein R' is selected from the group consisting of benzo and from zero to not more than 4 members selected from the group consisting of alkyl of not more than 3 carbon atoms, alkoxy of not more than 3 carbon atoms, hydroxy, halogen, and nitro.

The reaction proceeds readily in the presence of an inert reaction medium containing a catalytic amount of a base. In general, stoichiometric amounts of the reactants are employed, although a slight excess of either reactant can be employed if desired. When R' is hydroxy account should be taken of the fact that it will be acylated to a loweralkylcarbamyloxy or phenylcarbamyloxy group. Stoichiometrically, for each mole of the 2-hydroxybenzaldehyde, one mole of the required isocyanate is required when R' is other than hydroxy, and at least two moles when R' is hydroxy. Advantageously, the reaction is carried out between about 0° C. and about 75° C., preferably between about 15° C. and about 50° C. The rate of reaction is greater at the higher temperatures and the reaction is completed in less time, but side reactions are more likely to occur. Ordinarily it will not be necessary or desirable to use temperatures higher than about 50° C.

Suitable inert reaction media include diethyl ether (preferred), disopropyl ether, toluene, benzene, tetrahydrofuran, dimethylformamide, chloroform, and the like. Suitable bases for catalyzing the reaction include trimethylamine, triethylamine (preferred) and like trialkylamines, sodium hydroxide and like alkali metal hydroxides, the corresponding ethoxides and like alkoxides, sodium amide and like alkali metal amides, pyridine, picoline, collidine, dimethylaniline, and like basic amino compounds, tetramethylammonium hydroxide and like quaternary ammonium bases, and the like.

The 3,4 - dihydro-4-hydroxy-2H-1,3-benzoxazin-2-ones of the invention are readily recovered from the reaction mixture, since they are relatively insoluble in cold media of the kind indicated above, and they readily separate in solid form. The solids are conveniently recovered on a filter and purified by recrystallization if desired.

A great variety of 2-hydroxybenzaldehydes can be used in the process of the invention for preparing 3,4-dihydro-4-hydroxy-2H-1,3-benzoxazin-2-ones. Representative suitable 2-hydroxybenzaldehydes include: 2-hydroxybenzaldehyde, 2 - hydroxy-3-methoxybenzaldehyde, 5 - chloro-2-hydroxybenzaldehyde, 5-bromo-2-hydroxybenzaldehyde, 2-hydroxy-5-nitrobenzaldehyde, 3,5-dichloro - 2 - hydroxybenzaldehyde, 3-bromo-4-fluoro-2-hydroxybenzaldehyde, 6-fluoro - 2-hydroxy-5-nitrobenzaldehyde, 3 - bromo-4-chloro-2-hydroxy-5-nitrobenzaldehyde, 2 - hydroxy-3-methylbenzaldehyde, 2-hydroxy-3,4,6-trimethylbenzaldehyde, 2-hydroxy-4,5,6-trimethylbenzaldehyde, 5-ethyl-2-hydroxy-3-methylbenzaldehyde, 4,6 - dimethyl - 2-hydroxybenzaldehyde, 3,5-dibromo-4,6-dimethyl-2-hydroxybenzaldehyde, 2-hydroxy-4-methoxy-3-methylbenzaldehyde, 3-ethoxy-2-hydroxybenzaldehyde, 4,5,6 - trimethoxy-2-hydroxybenzaldehyde, 4,6-diethoxy-3 - ethyl-2-hydroxybenzaldehyde, 4-ethoxy-5-ethyl-6-methoxy - 2 - hydroxybenzaldehyde, 5-methoxy-3,4,6-trimethyl - 2 - hydroxybenzaldehyde, 3-propyl-2-hydroxybenzaldehyde, 3 - isopropyl-5-nitro-2-hydroxybenzaldehyde, 5-chloro-4,6-dimethyl-2-hydroxybenzaldehyde, 3-bromo-2-hydroxy-5-methoxybenzaldehyde, 2-hydroxy-6-methoxy-5-nitrobenzaldehyde, and 4,6-dimethoxy-2-hydroxybenzaldehyde.

The 3,4-dihydro-4-hydroxy-2H-1,3-benzoxazin-2-ones of this invention (compounds of Formula I) are pharmacologically active as sedatives in mammals, birds, and other animals. The compounds are also useful as intermediates for preparing 2-hydroxybenzylamines, a known class of useful compounds.

The 2-hydroxybenzylamines are obtained by hydrogenolytically cleaving the 3,4-dihydro-4-hydroxy-2H-1,3-benzoxazin-2-ones of Formula I with lithium aluminum hydride according to the following equation:

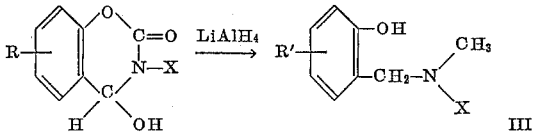

III wherein X, R and R' are as defined above (except when R is nitro, in which case R' can be reduced R).

The hydrogenolysis is conveniently accomplished in an inert reaction medium, for example, tetrahydrofuran (preferred), dioxane, dibutyl ether, diisopropyl ether, N-ethylmorpholine, and the like. An excess of lithium aluminum hydride is slowly added to the reaction mixture with stirring, and the mixture is then heated, conveniently, on a steam bath or at the reflux temperature of the reaction mixture. When the reaction is completed, the reaction mixture is decomposed with aqueous alkali, and the 2-hydroxybenzylamine is recovered by conventional procedures such as solvent extraction followed by distillation or solvent evaporation. The 2-hydroxybenzylamine product can be purified by conventional methods such as recrystallization or distillation under reduced pressure.

The free base 2-hydroxybenzylamines of Formula III can be reacted with fluosilicic acid to form fluosilicate salts in accordance with U.S. Patents 1,915,334 and 2,075,359. The amine fluosilicate salts thus obtained are effective as moth-proofing agents. The same free base compounds also form salts with thiocyanic acid, which salts can be condensed with formaldehyde in accordance with U.S. Patents 2,425,320 and 2,606,155 to form amine thiocyanate-formaldehyde condensation products for use as pickling inhibitors. They also form salts with trichloroacetic acid which are active as herbicides, for example, against Johnson grass, yellow foxtail, green foxtail, Bermuda grass, and quackgrass.

The invention may be more fully understood by reference to the following examples in which the parts and percentages are by weight unless otherwise specified.

EXAMPLE 1

A reaction mixture is prepared by mixing a solution of the starting 2-hydroxybenzaldehyde in anhydrous diethyl ether with a 50% solution of methyl isocyanate in toluene and triethylamine. The 50% solution of methyl isocyanate in toluene is added in the proportions of 120 g. for each mole of the starting 2-hydroxybenzaldehyde. This provides a slight excess of methyl isocyanate, that is, 1.05 moles methyl isocyanate per mole of the starting 2-hydroxybenzaldehyde. The reaction mixture is sealed in a flask and set aside at room temperature (about 25° C.) for a period of time ranging from 24 hrs. to 96 hrs. The crystals which precipitate are filtered and, if desired, recrystallized from a suitable solvent such as benzene, water, ethanol, dioxane-water, and the like.

By using the following 2-hydroxybenzaldehydes as starting compounds:
  (A) 2-hydroxybenzaldehyde,
  (B) 2-hydroxy-3-methoxybenzaldehyde,
  (C) 5-chloro-2-hydroxybenzaldehyde,
  (D) 5-bromo-2-hydroxybenzaldehyde,
  (E) 5-nitro-2-hydroxybenzaldehyde,
  (F) 2,5-dihydroxybenzaldehyde,
  (G) 3,5-dichloro-2-hydroxybenzaldehyde, and
  (H) 2-hydroxy-1-naphthaldehyde
there were obtained, respectively, the compounds listed in the following table:

The reaction of 5-nitro-2-hydroxybenzaldehyde with methyl isocyanate in Example 1E led to the formation of two compounds. After 24 hrs. yellow-orange crystals were present in the reaction mixture. After another 24 hrs. standing, long white needles were also present. These products were separated by using chloroform in which the needles readily dissolved. There was thus obtained 2.2 g. of 6-nitro-3,4-dihydro-4-hydroxy-3-methyl-2H-1,3-benzoxazin-2-one as yellow-orange crystals, M.P. 183–183.5° C. (dec.) after recrystallization from ethanol; and 0.35 g. of 6-nitro-3,4-dihydro-4-methylcarbamyloxy-3-methyl-2H-1,3-benzoxazin-2-one as white crystals, M.P. 165–166° C. (dec.).

The latter product was obtained in high yield according to the following example:

EXAMPLE 2

*6 - nitro - 3,4 - dihydro - 4 - methylcarbamyloxy - 3-methyl-2H-1,3-benzoxazin-2-one*

A mixture of 21.5 g. (0.13 mole) of 5-nitro-2-hydroxybenzaldehyde, 250 ml. of chloroform, 30 ml. of a 50% solution of methyl isocyanate (0.24 mole) in toluene, and 1.0 ml. of triethylamine was left at about 25° C. for 48 hrs. The white crystals present were removed by filtration. By adding diethyl ether to the mother liquor an additional amount of product precipitated. The solvent was evaporated under reduced pressure. The residue was dissolved in 250 ml. of chloroform and treated with 1 ml. of triethylamine and 30 ml. of a 50% solution of methyl isocyanate in toluene, as described above. There was obtained a total yield of 29.7 g. of 6-nitro-3,4-dihydro - 4 - methylcarbamyloxy - 3 - methyl - 2H - 1,3-benzoxazin-2-one, M.P. 165–166° C. (dec.).

*Analysis.*—Calcd. for $C_{11}H_{11}N_3O_6$: C, 46.98; H, 3.94; N, 14.94. Found: C, 46.82; H, 3.84; N, 14.54.

EXAMPLE 3

*Alternative preparation of 3,4-dihydro-4-hydroxy-3-methyl-2H-1,3-benzoxazin-2-one and hydrogenolysis thereof*

PART A

A mixture consisting of 30.5 g. (0.25 mole) of 2- hydroxybenzaldehyde, 200 ml. of anhydrous diethyl ether, 37.5 ml. of a 50% solution of methyl isocyanate in toluene (0.26 mole methyl isocyanate), and 0.5 ml. of triethylamine was heated at the reflux temperature for 2 hrs. After cooling the reaction mixture to about 25° C., a white solid that had separated was recovered on a filter. There was thus obtained 25.0 g. (55.8% yield) of 3,4 - dihydro- 4 - hydroxy - 3 - methyl - 2H - 1,3-benzoxazin-2-one, having a M.P. of 123°–124° C. (dec.).

TABLE I

| Ex. 1 | 2H-1,3-benzoxazin-2-one | Moles aldehyde | Anhydrous ether, ml. | Reaction time, hrs. | M.P.° C. (dec.) | Calcd. Found C | H | N |
|---|---|---|---|---|---|---|---|---|
| A | 3,4-dihydro-4-hydroxy-3-methyl- | 0.25 | 200 | 48 | [1] 123 | 60.33 / 60.40 | 5.06 / 5.06 | 7.82 / 7.06 |
| B | 8-methoxy-3,4-dihydro-4-hydroxy-3-methyl-. | 0.20 | 200 | 48 | [3] 156–158 | 57.41 / 57.74 | 5.30 / 5.45 | 6.70 / 6.82 |
| C | 6-chloro-3,4-dihydro-4-hydroxy-3-methyl- | 0.20 | 400 | 48 | [5] 170–171 | 50.59 / 50.83 | 3.78 / 3.83 | 6.56 / 6.49 |
| D | 6-bromo-3,4-dihydro-4-hydroxy-3-methyl- | 0.10 | 300 | 48 | [5] 175–177 | 41.80 / 41.52 | 3.16 / 3.26 | 5.43 / 5.45 |
| E [7] | 6-nitro-3,4-dihydro-4-hydroxy-3-methyl- | 0.024 | 300 | 48 | [3] 183–183.5 | 48.22 / 48.28 | 3.60 / 3.46 | 12.50 / 12.10 |
| F [6] | 6-methylcarbamyloxy-3,4-dihydro-4-hydroxy-3-methyl-. | 0.15 | 150 | 96 | [2] 177–178 | 52.38 / 52.53 | 4.80 / 4.60 | 11.11 / 10.96 |
| G | 6,8-dichloro-3,4-dihydro-4-hydroxy-3-methyl-. | 0.10 | 250 | 24 | [3] 179–180 | 43.58 / 43.74 | 2.85 / 2.59 | 5.65 / 5.47 |
| H | 5,6-benzo-3,4-dihydro-4-hydroxy-3-methyl- | 0.20 | 300 | 24 | [4] 180–181 | 68.11 / 68.13 | 4.84 / 4.67 | 6.11 / 5.96 |

[1] Recrystallized from benzene.
[2] From water.
[3] From ethanol.
[4] From dioxane-water.
[5] Not recrystallized.
[6] Instead of using 120 g. of a 50% CH₃NCO solution in toluene per mole of aldehyde, 240 g./mole was added.
[7] Instead of using 120 g. of a 50% CH₃NCO solution in toluene per mole of aldehyde, 160 g./mole was added (see below).

PART B.—N,N-DIMETHYL-2-HYDROXYBENZYLAMINE

A sample of 3,4 - dihydro - 4 - hydroxy - 3 - methyl-2H-1,3-benzoxazin-2-one (9.0 g.; 0.05 mole) prepared in Part A, above, was dissolved in 250 ml. of tetrahydrofuran (freshly distilled after refluxing for 3 hrs. with lithium aluminum hydride). To the stirred solution 5.0 g. of lithium aluminum hydride was added in small portions over an interval of 2 hrs. The mixture was then heated on a steam bath for 15 hrs. After cooling the reaction mixture to about 25° C., 20 ml. of 5% aqueous sodium hydroxide solution was carefully added. The decomposed reaction mixture was then extracted with diethyl ether. The ether extract was dried over anhydrous magnesium sulfate, filtered, and the ether was removed by distillation. There was thus obtained 3.5 g. of N,N-dimethyl-2-hydroxybenzylamine as an oil, B.P. 110–112° C. at 22 mm. of mercury pressure.

Analysis.—Calcd. for $C_9H_{13}NO$: C, 71.49; H, 8.67; N, 9.26. Found: C, 71.24; H, 8.40; N, 8.86.

EXAMPLE 4

Following the procedure of Example 3, but replacing methyl isocyanate with ethyl isocyanate, propyl isocyanate, isopropyl isocyanate, butyl isocyanate, pentyl isocyanate, hexyl isocyanate, isohexyl isocyanate, and octyl isocyanate there are obtained:

(A) 3,4 - dihydro-3 - ethyl - 4 - hydroxy - 2H - 1,3-benzoxazin-2-one,
(B) 3,4 - dihydro - 4 - hydroxy - 3 - propyl - 2H - 1,3-benzoxazin-2-one,
(C) 3,4 - dihydro - 4 - hydroxy - 3 - isopropyl - 2H - 1,3-benzoxazin-2-one,
(D) 3 - butyl - 3,4 - dihydro - 4 - hydroxy - 2H - 1,3-benzoxazin-2-one,
(E) 3,4 - dihydro - 4 - hydroxy - 3 - pentyl - 2H - 1,3-benzoxazin-2-one,
(F) 3,4 - dihydro - 3 - hexyl - 4 - hydroxy - 2H - 1,3-benzoxazin-2-one,
(G) 3,4 - dihydro - 4 - hydroxy - 3 - isohexyl - 2H - 1,3-benzoxazin-2-one, and
(H) 3,4 - dihydro - 4 - hydroxy - 3 - octyl - 2H - 1,3-benzoxazin-2-one, respectively, and the corresponding N-loweralkyl-N-methyl-2-hydroxybenzylamines, namely, (A') N-ethyl-N-methyl-2-hydroxybenzylamine,
(B') N-propyl-N-methyl-2-hydroxybenzylamine,
(C') N-isopropyl-N-methyl-2-hydroxybenzylamine,
(D') N-butyl-N-methyl-2-hydroxybenzylamine,
(E') N-pentyl-N-methyl-2-hydroxybenzylamine,
(F') N-hexyl-N-methyl-2-hydroxybenzylamine,
(G') N-isohexyl-N-methyl-2-hydroxybenzylamine, and
(H') N-octyl-N-methyl-2-hydroxybenzylamine.

EXAMPLE 5

By applying the process of Example 3B to compounds of Example 1, there are obtained the following N,N-dimethyl-2-hydroxybenzylamines: 3-methoxy-N,N-dimethyl-2 - hydroxybenzylamine, 5 - chloro - N,N - dimethyl-2 - hydroxybenzylamine, 5 - bromo - N,N - dimethyl - 2-hydroxybenzylamine, N,N - dimethyl - 2,5 - dihydroxybenzylamine, 3,5 - dichloro - N,N - dimethyl - 2 - hydroxybenzylamine, and 5,6-benzo-N,N-dimethyl-2-hydroxybenzylamine.

EXAMPLE 6

*3,4 - dihydro - 4 - hydroxy - 3 - phenyl - 2H - 1,3-benzoxazin-2-one*

By substituting the methyl isocyanate of Example 1A by phenyl isocyanate and keeping the temperature at between 0° and 10° C., 3,4-dihydro-4-hydroxy-3-phenyl-2H-1,3-benzoxazin-2-one was obtained, which after recrystallization from benzene had a melting point of 113–114° C. (dec.) and the following elemental analysis:

Calcd. for $C_{14}H_{11}NO_3$: C, 69.7; H, 4.59; N, 5.8. Found: C, 69.26; H, 4.68; N, 5.69.

EXAMPLE 7

*3,4 - dihydro - 4 - phenylcarbamyloxy - 3 - phenyl - 2H-1,3-benzoxazin-2-one*

To a solution of o-hydroxybenzaldehyde (12.2 g.; 0.10 mole), phenyl isocyanate (25.0 g.; 0.21 mole) and anhydrous diethyl ether (100 ml.) was added triethylamine (1.0 ml.). A vigorous reaction took place and a white precipitate was formed. The mixture was heated under reflux for 2 hrs. After cooling to room temperature, the solid was filtered off, washed with diethyl ether, and dried. The yield was quantitative, M.P. 143–145° (dec.). Recrystallization from benzene gave 3,4-dihydro-4-phenylcarbamyloxy-3-phenyl-2H-1,3-benzoxazin-2-one as a colorless product, M.P. 148–149° C. (dec.).

Analysis.—Calcd. for $C_{21}H_{16}N_2O_4$: C, 69.98; H, 4.48; N, 7.78. Found: C, 70.3; H, 4.8; N, 7.7.

By applying the process of Example 3B to 3,4-dihydro-4 - phenylcarbamyloxy-3-phenyl-2H-1,3-benzoxazin-2-one there is obtained N-methyl-N-phenyl-2-hydroxybenzyl.amine.

I claim:
1. A compound of the formula:

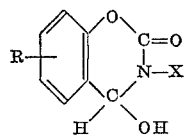

wherein R is selected from the group consisting of benzo and from zero to not more than 4 members selected from the group consisting of alkyl of not more than 3 carbon atoms, alkoxy of not more than 3 carbon atoms, loweralkylcarbamyloxy, phenylcarbamyloxy, halogen, and nitro, and X is selected from the group consisting of loweralkyl and phenyl.

2. 3,4 - dihydro - 4 - hydroxy - 3 - methyl - 2H - 1,3-benzoxazin-2-one.

3. 3,4 - dihydro - 4 - hydroxy - 3 - phenyl - 2H - 1,3-benzoxazin-2-one.

4. 6 - halo-3,4-dihydro-4-hydroxy-3-loweralkyl-2H-1,3-benzoxazin-2-one.

5. 6 - chloro - 3,4-dihydro-4-hydroxy-3-methyl-2H-1,3-benzoxazin-2-one.

6. 6 - bromo - 3,4 - dihydro - 4 - hydroxy - 3 - methyl-2H - 1,3 - benzoxazin - 2 - one.

7. 6,8 - dihalo - 3,4 - dihydro - 4 - hydroxy - 3 - loweralkyl - 2H - 1,3 - benzoxazin - 2 - one.

8. 6,8 - dichloro - 3,4 - dihydro - 4 - hydroxy - 3-methyl - 2H - 1,3 - benzoxazin - 2 - one.

9. 8 - alkoxy - 3,4 - dihydro - 4 - hydroxy - 3 - loweralkyl - 2H - 1,3 - benzoxazin - 2 - one in which alkoxy is of not more than 3 carbon atoms.

10. 8 - methoxy - 3,4 - dihydro - 4 - hydroxy - 3-methyl - 2H - 1,3 - benzoxazin - 2 - one.

11. 6 - nitro - 3,4 - dihydro - 4 - hydroxy - 3 - loweralkyl - 2H - 1,3 - benzoxazin - 2 - one.

12. 6 - nitro - 3,4 - dihydro - 4 - hydroxy - 3 - methyl-2H - 1,3 - benzoxazin - 2 - one.

13. 6 - methylcarbamyloxy - 3,4 - dihydro - 4 - hydroxy-3 - methyl - 2H - 1,3 - benzoxazin - 2 - one.

14. 5,6 - benzo - 3,4 - dihydro - 4 - hydroxy - 3 - methyl-2H - 1,3 - benzoxazin - 2 - one.

15. 6 - nitro - 3,4 - dihydro - 4 - methylcarbamyloxy-3 - methyl - 2H - 1,3 - benzoxazin - 2 - one.

16. 3,4 - dihydro - 4 - phenylcarbamyloxy - 3 - phenyl-2H - 1,3 - benzoxazin - 2 - one.

17. The process which comprises reacting, in the presence of a basic catalyst and an inert reaction medium at a temperature between about 0° C. and about 75° C. a 2-hydroxybenzaldehyde of the formula:

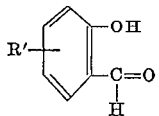

wherein R' is selected from the group consisting of benzo and from zero to not more than 4 members selected from the group consisting of alkyl of not more than 3 carbon atoms, alkoxy of not more than 3 carbon atoms, hydroxy, halogen, and nitro, with a compound selected from the group consisting of phenyl isocyanate and a loweralkyl isocyanate to produce a compound of the formula:

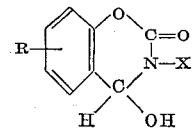

wherein X and R are as given in claim 1.

No references cited.

WALTER A. MODANCE, *Primary Examiner.*

R. T. BOND, *Assistant Examiner.*